United States Patent [19]

Horlbeck et al.

[11] 4,328,059

[45] May 4, 1982

[54] HIGH-MOLECULAR WEIGHT LINEAR POLYESTERS AND A PROCESS FOR PREPARING THEM

[75] Inventors: Gernot Horlbeck, Haltern; Klaus Burzin, Marl, both of Fed. Rep. of Germany

[73] Assignee: Chemische Werke Huels, A.G., Marl, Fed. Rep. of Germany

[21] Appl. No.: 195,538

[22] Filed: Oct. 9, 1980

[30] Foreign Application Priority Data

Nov. 13, 1979 [DE] Fed. Rep. of Germany ....... 2945729

[51] Int. Cl.$^3$ .................... B05D 3/00; C08K 3/22; C08L 67/02; C09J 3/16
[52] U.S. Cl. .................. 156/332; 427/195; 528/286; 528/302; 528/487; 524/139
[58] Field of Search .............. 528/286, 302, 487; 260/45.7 P; 525/2; 427/195; 156/332

[56] References Cited

U.S. PATENT DOCUMENTS

| | | | |
|---|---|---|---|
| 3,546,177 | 12/1970 | Kibler et al. | 528/286 |
| 3,787,530 | 1/1974 | Bohn et al. | 528/302 |
| 4,115,371 | 9/1978 | Bier et al. | 260/45.7 P |
| 4,123,420 | 10/1978 | Kyo et al. | 525/2 |
| 4,173,658 | 11/1979 | Bax et al. | 427/195 |
| 4,208,527 | 6/1980 | Horlbeck et al. | 528/286 |
| 4,252,940 | 2/1981 | Sublett | 156/332 |

FOREIGN PATENT DOCUMENTS

| | | | |
|---|---|---|---|
| 47-42388 | 10/1972 | Japan | 538/302 |
| 48-27583 | 8/1973 | Japan | 528/286 |
| 769220 | 3/1957 | United Kingdom | 528/286 |

*Primary Examiner*—Allan Lieberman
*Attorney, Agent, or Firm*—Millen & White

[57] ABSTRACT

High molecular weight linear polyesters advantageous for use as hot melt adhesives and powder coating agents, are prepared by a process for preparing a high-molecular weight, linear copolyester by condensing 40–85 molar percent of terephthalic acid optionally in the form of a dialkyl ester, half of which component can optionally be replaced by another dicarboxylic acid also optionally in the dialkyl ester form, and 60–15 molar percent of adipic acid, with an alkanediol of 2–6 carbon atoms in its carbon chain, at an elevated temperature in the presence of a conventional catalyst, in a first condenstation stage which is an interesterification or esterification stage and a second condenstation stage which is a polycondensation stage, whereby a copolyester melt is produce. The process comprises, before or during the first condensation stage, adding 0.005–01 molar percent, based on the total acid component, of a $C_6$- aryl or $C_7$-alkaryl ester of phosphorous acid or of phosphoric acid to the reaction mixture; and, after termination of the second condensation stage, adding 0.01–0.2 molar percent, based on the total acid component, of hypophosphorous acid to the finished copolyester melt.

8 Claims, No Drawings

HIGH-MOLECULAR WEIGHT LINEAR POLYESTERS AND A PROCESS FOR PREPARING THEM

BACKGROUND OF THE INVENTION

The present invention relates to a process for preparing high-molecular weight, linear copolyesters by the condensation of 40–85 molar percent of terephthalic acid, which component can be substituted to up to 50% by other dicarboxylic acids, and 60–15 molar percent of adipic acid with alkanediols having 2–6 carbon atoms in the carbon chain, in 2 stages at an elevated temperature in the presence of conventional catalysts.

Such copolyesters, as well as their manufacture, are known in principle (Korshak/Vinogradova—Polyesters, Pergamon Press, Oxford [1965]: 141 et seq.; Sorensen/Campbell—Preparative Methods of Polymer Chemistry; Polyesters, Interscience Publishers, New York [1961]: 111–127 U.S. Pat. No. 2,901,466).

Their uses as powder coating agents (DAS's [German Published Applications] Nos. 2,611,691; 1,222,205), and as hot melt adhesives (DOS [German Unexamined Laid-Open Application] No. 2,703,417) have likewise been disclosed.

At the high temperatures required for the polycondensation, especially in the second condensation stage (polycondensation stage), the presence of adipic acid results in final products which have a brownish to red discoloration. This is unacceptable to the processor of these products. Therefore, the addition of esters and salts of phosphoric acids in conjunction with talc has been proposed (DOS No. 2,703,417). At a low adipic acid content of the copolyesters (<15 molar percent based on the total acid component), these measures partially improve the color of the finished products. At higher adipic acid contents, the undesirable discolorations cannot be avoided to an adequate extent.

Adipic-acid-containing copolyesters exhibit an additional grave deficiency. In the melt, they do not show adequate stability against degradation by thermal oxidation. Yet, such stability is absolutely required, for example, in hot-melt [fusion] adhesives, since the latter are kept in open melt tanks during their processing for a prolonged period of time.

SUMMARY OF THE INVENTION

Accordingly, it is an object of the present invention to provide linear, high-molecular weight polyesters which do not exhibit the above-described disadvantages, as well as a process for preparing them and methods of using them, e.g., as hot-melt adhesives and/or powder coating agents.

Upon further study of the specification and appended claims, further objects and advantages of this invention will become apparent to those skilled in the art.

These objects have been attained by adding to the reaction mixture, before or during the first condensation stage, 0.005–0.1 molar percent, based on the total acid component, of aryl esters of phosphorous acid or of phosphoric acid; and, after termination of the second condensation stage, adding 0.01–0.2 molar percent, based on the total acid component, of hypophosphorous acid to the finished copolyester melt.

DETAILED DISCUSSION

Suitable aryl moieties for the phosphorous or phosphoric acid esters include $C_{6-10}$-aryl, e.g., phenyl, naphthyl etc. or $C_{7-20}$-alkaryl containing 1–2 alkyl groups, e.g., tert-butylphenyl, nonylphenyl, cresylphenyl, etc. Mono-, di- and tri-esters are suitable.

Suitable aryl esters of phosphorous acid or phosphoric acid include, for example, triphenyl, tri-tert-butylphenyl, trinonylphenyl, tricresyl phosphates and similar compounds, as well as the corresponding phosphites. As mentioned, the object of this invention can also be attained if only partially esterified compounds are employed. Preferably, triphenyl phosphate is utilized. The aryl esters are preferably employed in amounts of 0.02–0.06 molar percent based on the total acid component.

The hypophosphorous acid is preferably added in a quantity of 0.03–0.15 molar percent based on the total acid component. This acid can be stirred into the polyester melt, for example, as a 50% strength aqueous solution.

The acid component of the copolyesters contains 40–85 molar percent, preferably 50–75 molar percent, of terephthalic acid and 15–60 molar percent, preferably 25–50 molar percent, of adipic acid.

Up to 50 molar percent of the terephthalic acid can be replaced by other aromatic, cycloaliphatic and/or aliphatic dicarboxylic acids, such as phthalic acid, isophthalic acid; tetra-(hexa-)hydrophthalic acid, -isophthalic acid, -terephthalic acid; oxalic acid, malonic acid, succinic acid, glutaric acid, sebacic acid, 1,10-decanedicarboxylic acid, and others.

All aforementioned acids can be utilized in the form of their $C_1$-$C_4$-alkyl ester derivatives.

Suitable diols include alkanediols of 2–6 carbon atoms in the carbon chain. Examples include ethylene glycol, propylene glycol, butylene glycol etc. Ethylene glycol and butylene glycol are preferred. The alkanediols can also be used in admixture.

The polyester preparative process is basically conventional and unless specified otherwise herein, all details of the process of this invention are in accordance with these prior art procedures, e.g., as disclosed in Sorensen and Campbell—Preparative Methods of Polymer Chemistry, Interscience Publishers, Inc., New York [1961]: 111–127; Kunststoff-Handbuch [Plastics Manual] 8 [Polyesters], Carl Hanser publishers, Munich [1973]: 697, where disclosures are incorporated by reference herein. Thus, the starting compounds can be, for example, the dimethyl esters of the acids, and the diols, and an interesterification is first carried out, after the addition of a suitable conventional catalyst. When dicarboxylic acids per se are employed, the esterification can take place at the same time or after the interesterification. This process stage is referred to as the first condensation stage hereinabove. Subsequently, the polycondensation, (i.e., the second condensation stage) is executed under vacuum or in a nitrogen stream with further heating.

The polyesters prepared by the process of this invention have a viscosity number of 50–120 cc/g, preferably 70–100 cc/g.

The copolyesters prepared and used according to this invention exhibit a superior thermal-oxidation stability while retaining good general properties. They do not exhibit any color tinge.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

The data recited below have been determined using the following measuring methods:

1. The viscosity number was measured on solutions of 0.23 g of copolyester in 100 ml of phenol/1,1,2,2-tetrachloroethane (weight ratio 60:40) at 25° C.
2. The color measurements were conducted according to the tristimulus method against a white standard (DIN [German Industrial Standard] 5033).
3. The oxidation stability was characterized by the percentage reduction in viscosity number after a one-hour storage of the specimens at 250° C. in a drying chamber with air circulation.

POLYESTER PREPARATION

Example 1

In a 100-liter reactor, a melt is prepared from 27.2 kg of dimethyl terephthalate, 8.7 kg of adipic acid, 36 kg of 1,4-butanediol, 20 g of triphenyl phosphate and 18 g of titanium tetraisopropylate at 150° C. in a nitrogen stream while stirring until the theoretical amount of methanol and $H_2O$ has been split off.

Thereafter the reaction temperature is increased to 250° C. within one hour and, within one additional hour, a vacuum of 1 millibar is applied. Under these conditions the melt is polycondensed for two hours. Then the vacuum is eliminated and the nitrogen is driven off. 20 g of hypophosphorous acid (50% solution in water) is added to the melt and the mixture is agitated for 30 minutes. The polyester is discharged, cooled and granulated.

A product is obtained having a melting point of 180° C. as determined by differential scanning calorimetry (DSC).

Example 2

In a 100-liter reactor, a melt is prepared from 27.2 kg of dimethyl terephthalate, 27 kg of 1,4-butanediol, as well as 20 g of titanium tetraisopropylate. The mixture is then reacted at 190° C. in a nitrogen stream until the theoretically calculated amount of methanol has been split off. 50 g of triphenyl phosphite is added to the melt and the latter is stirred for 20 minutes. Thereafter, 8.7 kg of adipic acid is added and the reaction is continued at 190° C. and under a nitrogen stream. The esterification is terminated after the theoretical quantity of water has been split off.

The polycondensation reaction is conducted as described in Example 1.

After the nitrogen has been driven off and the vacuum eliminated, 40 g of $H_3PO_2$ (50% aqueous solution) is added to the melt and the latter is stirred for 30 minutes.

Example 3

27.2 kg of dimethyl terephthalate, 8.7 kg of adipic acid, as well as 32 kg of 1,4-butanediol and 15 g of titanium tetraisopropylate are, first of all, melted at 150° C. and then interesterified and/or esterified at 190° C. in a nitrogen stream while stirring. Once two-thirds of the theoretically calculated amount of methanol and water has been split off, 12 g of tri-tert-butylphenyl phosphate is added to the reaction mixture. The interesterification or esterification is then continued until the theoretical quantities of methanol and water have been split off.

The following polycondensation reaction is executed in accordance with Example 1. After elimination of the vacuum and driving off the nitrogen, 8 g of hypophosphorous acid is added to the molten polyester and the mixture is agitated for 45 minutes.

Comparative Examples A and B

The comparative experiments are conducted according to the details of Example 1. In Example A, no hypophosphorous acid is stirred into the copolyester melt after the second condensation stage; the same holds true for Example B, with the difference being that triphenyl phosphite is used instead of triphenyl phosphate in the first condensation stage.

The physical parameters (viscosity, melting point) of the polyesters correspond to those of the Examples of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE

| Example | Viscosity Number [cc/g] | Reduction in Viscosity Number After 1 h/250° C./Air [%] | Color (Blue/Yellow Value*) |
|---|---|---|---|
| 1 | 70 | 8 | −5.7 |
| 2 | 67 | 8 | −5.9 |
| 3 | 73 | 6 | −6.2 |
| A | 72 | 25 | −17.0 |
| B | 68 | 22 | −10.4 |

*Blue/Yellow Value of $BaSO_4$: −1.5

What is claimed is:

1. A process for preparing a high-molecular weight, linear copolyester by condensing 40-85 molar percent of terephthalic acid optionally in the form of a dialkyl ester, half of which component can optionally be replaced by another dicarboxylic acid also optionally in the dialkyl ester form, and 60-15 molar percent of adipic acid, with an alkanediol of 2-6 carbon atoms in its carbon chain, at an elevated temperature in the presence of a conventional catalyst, in a first condensation stage which is an interesterification or esterification stage and a second condensation stage which is a polycondensation stage, whereby a copolyester melt is produced, which comprises, before or during the first condensation stage, adding 0.005-0.1 molar percent, based on the total acid component, of a $C_{6-10}$-aryl or $C_{7-20}$-alkaryl ester of phosphorous acid or of phosphoric acid to the reaction mixture; and, after termination of the second condensation stage, adding 0.01-0.2 molar percent, based on the total acid component, of hypophosphorous acid to the finished copolyester melt.

2. A process of claim 1, whererin before or during the first condensation stage, 0.02-0.06 molar percent of the aryl or alkaryl ester is added.

3. A process of claim 1 wherein after termination of the second condensation stage, 0.03–0.15 molar percent of hypophosphorous acid is added to the copolyester melt.

4. A process of claim 1 wherein the aryl or alkaryl ester is triphenyl-, tri-tert-butylphenyl-, trinonylphenyl- or tricresyl- phosphate or phosphite.

5. A process of claim 1 wherein triphenyl phosphate is the aryl ester.

6. A high molecular weight copolyester prepared by the process of claim 1.

7. A method of adhering materials using a hot melt adhesive which comprises adhering materials with a hot melt adhesive which is a high molecular weight copolyester of claim 6.

8. A method of coating using a powder coating agent which comprises coating with a powder coating agent which is a high molecular weight copolyester of claim 6.

* * * * *